July 30, 1957 R. P. MORRISON 2,801,003
METHOD AND APPARATUS FOR RECOVERING VALUABLE MINERALS
Filed Jan. 16, 1952
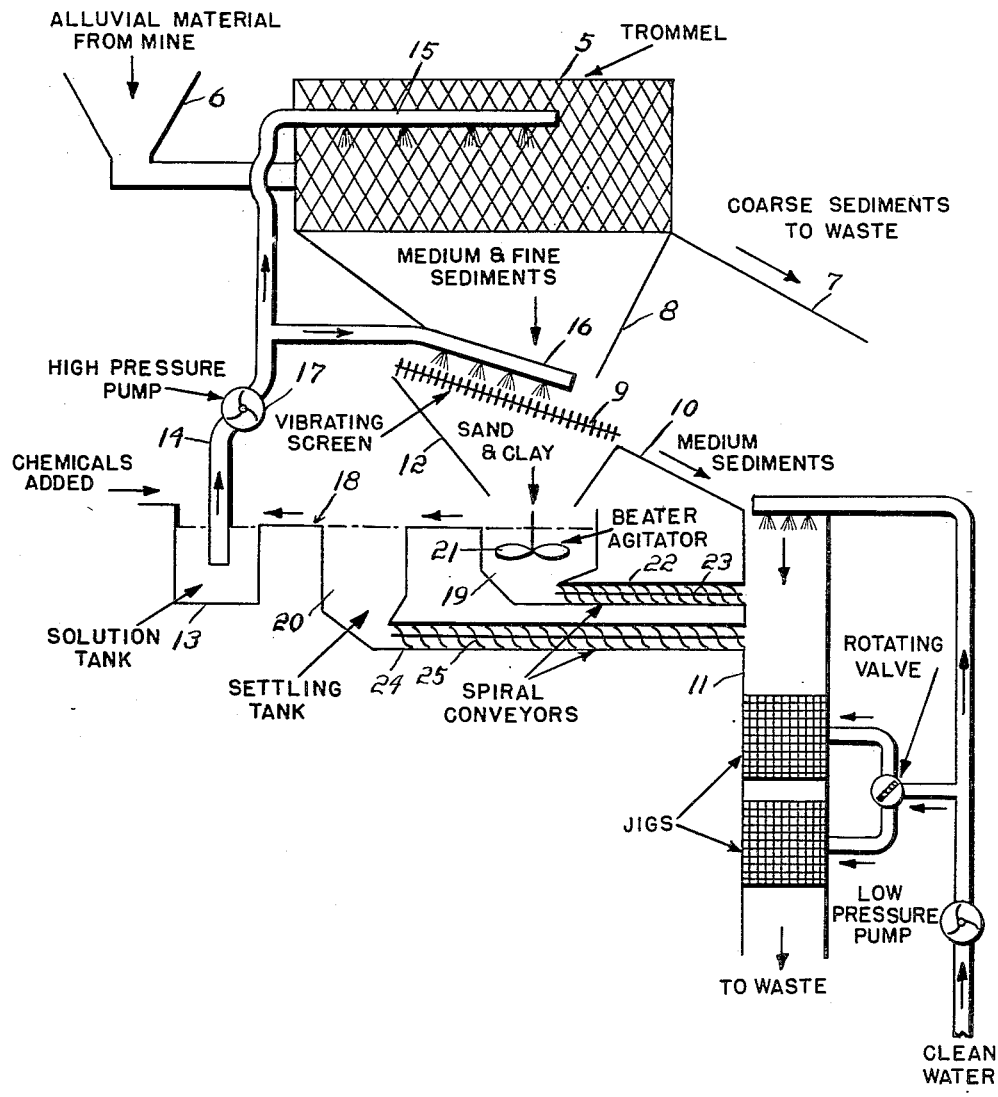
Inventor:
Robert P. Morrison,
by Abbott Spear
Attorney United States Patent Office 2,801,003
Patented July 30, 1957

2,801,003

METHOD AND APPARATUS FOR RECOVERING VALUABLE MINERALS

Robert P. Morrison, Caracas, Venezuela

Application January 16, 1952, Serial No. 266,635

7 Claims. (Cl. 209—13)

This invention relates to method of and apparatus for use in effecting the release of gold and other valuable minerals from enclosing sedimentary materials which contain hydrophilic colloidal clays.

In the exploitation of alluvial mineral deposits containing gold or other heavy minerals, the mineral is recovered by disintegrating alluvial sediments with water and by gravity separation. Equipment to effect such recovery by gravity separation, has been developed that is efficient when the alluvial material contains insignificant amounts of hydrophilic colloidal clay or clays.

Such equipment includes a variety of standard gravity mineral-recovery machinery such as jigs, riffle tables, vibrating tables, blanket tables, sluices, greased tables, and amalgamating equipment. The jig, which is one of the most widely used, utilizes a pulsating water stream which pours through screens to separate the sediment into heavier mineral particles and lighter gravel, sand and clay particles which are carried to waste. Such equipment usually includes a revolving cylindrical screen or a vibrating screen to break up the alluvial material before it is passed to the jig.

Hydrophilic colloidal clays are often found in sediments containing valuable heavy materials, especially gold, and they tend to swell, when wetted and resist dispersion. As a consequence, tough and sticky balls or pellets, containing particles of the valuable mineral, form and these pass through conventional equipment to waste without being disintegrated and they also pick up and carry with them small mineral particles. Usually, such clay particles may be disintegrated by substantially increasing the time of their exposure to the action of the equipment but the reduction in the capacity of the equipment resulting from so doing renders that expedient uneconomical.

In accordance with the present invention, the alluvial material is screened to separate it into coarse waste, medium, and fine sediments and during the screening, the material is subjected to a force spray of an alkaline aqueous solution. The screening may be effected by a trommel, a vibrating screen or both.

The medium sediments are delivered to a gravity separating station while the sprayed solution and fine sediments discharge to a return in communication with the pump controlled source for the solution. In that return, further clay dispersion is effected as by agitators, settling tanks or both and the undispersed fine sediments are conveyed to the separating station.

The function of the alkaline aqueous solution is to ensure dispersion of the hydrophilic colloidal clay or clays present in the alluvial material as the degree of their dispersion in a medium is controlled by the hydrogen ion concentration in that medium. As the clay present in any alluvial material is usually a mixture of several of the clay minerals and in varying proportions and is also affected by the presence of other chemical constituents, the properties of the clay to be dispersed varies within certain limits so that the most effective pH value for any clay mass must be determined by experimentation but the approximate range of such values is 7 to 11.

In the drawing, the single figure shows schematically apparatus in accordance with the invention from which these and other of its novel features and advantages will be readily apparent.

As indicative of means to screen alluvial material into coarse waste, medium, and fine sediments, a trommel 5 is shown having a hopper 6 at its infeed end and a discharge 7 by which the coarse sediments are carried to waste.

Medium and fine particles fall from the trommel 5 and are discharged as through a chute 8 to an inclined vibrating screen 9 which functions to separate the medium sediments from the fine sediments and to deliver them along the discharge 10 to the jig unit 11 which is not detailed since it may be of any conventional type and is shown as illustrative of screening and separating means that are satisfactory in use. The fine sediments discharge through a chute 12.

In accordance with the invention, a tank 13 is provided with a delivery conduit 14 leading to a set of spray nozzles 15 and 16 and having a high pressure pump 17. Spray nozzles 15 and 16 are associated with the screening devices 5 and 8, respectively.

Below the fine sediment chute 12, there is a liquid return, generally indicated at 18, in communication with the supply tank 13. The return 18 is shown as including first and second sediment tanks 19 and 20. The first sediment tank 19 is located directly below the chute 12 and in it is a beater-agitator 21. The second sediment tank 20 is a settling tank and is located between the first sediment tank 19 and the supply tank 13.

The sediment tank 19 has a conduit 22 effecting communication between its bottom and the jig unit 11 in which is located a spiral conveyor 23. A similarly disposed conduit 24 interconnects the sediment tank 20 and the jig unit 11 and it is provided with a spiral conveyor 25. By these or equivalent means, undispersed sediments and heavy mineral materials are removed from the solution as it flows back to the tank 13 and are delivered to the jig unit 11.

In practice, the tank 13 is a source of an alkaline aqueous solution the pH range of which being approximately 7 to 11. Various chemicals may be used for controlling the pH value of the solution but only the less expensive of these are adapted for industrial usage. Complex phosphates such as sodium hexametaphosphate and sodium pyrophosphate, etc., sodium oxalate, sodium silicate and, crude tannic acid with either hydrated lime or caustic soda are among those adapted for use. As stated, the effective pH value of the solution depends on the particular clay or clays present in the alluvial material, the nature of exchangeable bases adsorbed by the clay particles, and on the nature of soluble chemical materials present in the sediments.

In operation, the most effective pH valve for the solution is determined from samples of the alluvial material, and a suitable supply of the solution is prepared. As the alluvial material is screened into coarse waste, medium and fine sediments, it is subjected to high pressure spray treatment. The medium sediments pass to the jigs which utilize clear, untreated water.

The fine sediments pass with the sprayed solution into the return 18 and are beaten in the tank 19 by the agitator 21 to complete the dispersion of the fine clay particles in the solution. Heavier particles of the fine sediment that settle in the tank 19 are delivered to the jig unit 11. The solution overflows from the tank 19 into the tank 20 again to enable heavier particles to settle for delivery to the jig unit 11. The solution then passes back to the tank 13 for re-use.

The invention thus makes possible the economic exploitation of alluvial mineral deposits containing hydrophilic colloidal clays.

While specific mention has been made of gold as the valuable mineral to be recovered from the alluvial material, the invention is equally well adapted for other uses such as for example the recovery of diamonds and valuable heavy mineral materials (i. e., mineral substances with specific gravities greater than 2.90 according to the definition of H. B. Milner) from materials containing hydrophilic colloidal clays for which no known mechanical disintegration and separation methods are effective.

What I therefore claim and desire to secure by Letters Patent is:

1. A process for effecting the release of gold and other valuable minerals from enclosing sedimentary materials containing hydrophilic colloidal clays, said process comprising screening alluvial material to separate it into coarse waste, medium and fine sediments, circulating an aqueous solution, the pH value of which is approximately in the range of 7 to 11, and during its circulation spraying the material being screened both to wash said material and to disperse said clays, rendering the medium sediments substantially free of said solution and separating them into wanted and unwanted groups, utilizing the circulating solution to convey the fine sediments for further clay dispersion, separating undispersed fine sediments from said solution before its re-use as a spray, and separating said undispersed fine sediments into wanted and unwanted groups.

2. A process for effecting the release of gold and other valuable minerals from enclosing sedimentary materials containing hydrophilic colloidal clays, said process comprising screening alluvial material to separate it into coarse waste, medium and fine sediments, circulating an aqueous solution, the pH value of which is approximately in the range of 7 to 11, and during its circulation spraying the material being screened both to wash said material and to disperse said clays, separating the medium sediments from said solution and then further separating them by screening and by gravity into wanted and unwanted groups, utilizing the circulating solution to convey the fine sediments, agitating the sediment carrying solution to further clay dispersion, separating undispersed fine sediments from said solution before its re-use as a spray and then separating the fine sediments by screening and gravity into wanted and unwanted groups.

3. A process for effecting the release of gold and other valuable minerals from enclosing sedimentary materials containing hydrophilic colloidal clays, said process comprising subjecting alluvial materials to a first screening action to separate medium and fine sediments from coarse waste sediments, subjecting the medium and fine sediments to a second screening action to separate medium and fine sediments from each other, subjecting the medium sediments directly to a third screening and to gravity separation, providing a source of an aqueous solution the pH value of which is approximately in the range of 7 to 11, in circulating the solution in said source and during its circulation utilizing that solution to wash the alluvial material and to disperse the hydrophilic colloidal clays, utilizing the circulated solution to carry said fine sediments, separating said fine sediments from said solution and separating them by screening and by gravity into wanted and unwanted groups.

4. Apparatus for effecting the release of gold and other valuable minerals from enclosing sedimentary material containing hydrophilic colloidal clays, said apparatus comprising means to screen alluvial material and separate it into coarse waste, medium, and fine sediments and including a spray unit, a pump controlled tank for an alkaline aqueous solution connected to said spray unit, a return in communication with said tank and including a part disposed to receive fine sediments and liquid from said screening and separating means, a separating station, means to deliver medium sediments from said screening means to said station, means in said return to separate undispersed fine sediments from said liquid, and means to deliver such undispersed fine sediments to said station.

5. Apparatus for effecting the release of gold and other valuable minerals from enclosing sedimentary material containing hydrophilic colloidal clays, said apparatus comprising means to screen alluvial material and separate it into coarse waste, medium, and fine sediments and including a spray unit, a pump controlled tank for an alkaline aqueous solution connected to said spray unit, a return in communication with said tank and including a part disposed to receive fine sediments and liquid from said screening means, a screening and gravity separating station, means to deliver medium sediments from said screening and separating means to said station, means in said return to separate undispersed fine sediments from said liquid, and a spiral conveyor to deliver such undispersed fine sediments to said station.

6. Apparatus for effecting the release of gold and other valuable minerals from enclosing sedimentary material containing hydrophilic clays, said apparatus comprising means to screen alluvial material and separate it into coarse waste, medium, and fine sediments and including a spray unit, a pump controlled tank for an aqueous alkaline solution connected to said spray unit, a return in communication with said tank and including a part disposed to receive fine sediments and liquid from said screening and separating means and including first and second sediment tanks, an agitator in said first sediment tank, said second sediment tank being located adjacent said liquid tank and constituting a settling tank, a screening and gravity separating station, means to deliver medium sediments from said screening means to said station, and means to deliver undispersed fine sediments from said sediment tanks to said station.

7. Apparatus for effecting the release of gold and other valuable minerals from enclosing sedimentary material containing hydrophilic colloidal clays, said apparatus comprising a first screening station wherein medium and fine sediments are separated from coarse waste sediments, a second screening station disposed to receive said medium and fine sediments and operating to separate them from each other, a third screening and gravity separating station wherein the mineral is recovered and including a part receiving said medium sediments directly from said second station, a tank for an aqueous alkaline solution, means to deliver said solution from said tank as a spray at said first and second stations, a return in communication with said tank and including a part disposed to receive the solution from said first and second station and the fine sediments from said second station, and means in said return to separate fine undispersed sediments from said solution and to deliver said fine undispersed sediments to said third station.

References Cited in the file of this patent

UNITED STATES PATENTS

| 509,818 | Lockhart | Nov. 28, 1893 |
| 1,183,805 | Downerd | May 16, 1916 |
| 1,454,838 | Borcherdt | May 8, 1923 |
| 1,491,296 | France | Apr. 22, 1924 |
| 1,769,217 | Franz | July 1, 1930 |
| 2,072,063 | Alton | Feb. 23, 1937 |

FOREIGN PATENTS

| 612,075 | Great Britain | Nov. 8, 1948 |